(12) United States Patent (10) Patent No.: US 12,689,835 B2

Saito et al. (45) Date of Patent: Jul. 21, 2026

(54) IMAGING APPARATUS AND IMAGING SYSTEM

(71) Applicant: Panasonic Intellectual Property Management Co., Ltd., Osaka (JP)

(72) Inventors: Tetsuo Saito, Osaka (JP); Takayuki Tochio, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 161 days.

(21) Appl. No.: 18/654,045

(22) Filed: May 3, 2024

(65) Prior Publication Data

US 2024/0380988 A1 Nov. 14, 2024

(30) Foreign Application Priority Data

May 12, 2023 (JP) ................................. 2023-079508

(51) Int. Cl.
*H04N 23/951* (2023.01)
*G06T 5/50* (2006.01)
(Continued)

(52) U.S. Cl.
CPC ............. *H04N 23/951* (2023.01); *G06T 5/50* (2013.01); *H04N 23/62* (2023.01); *H04N 23/667* (2023.01); *H04N 23/71* (2023.01)

(58) Field of Classification Search
None
See application file for complete search history.

(56) References Cited

U.S. PATENT DOCUMENTS 6,965,410 B1 * 11/2005 Yamagishi ........... H04N 23/633
348/241
8,982,249 B2 * 3/2015 Uchida ................ H04N 23/741
348/229.1
(Continued)

FOREIGN PATENT DOCUMENTS

JP 2000-184269 A 6/2000
JP 2007300189 A * 11/2007
(Continued)

OTHER PUBLICATIONS

English translation of JP-2016187125-A, Kanda, 2016 (Year: 2016).*
(Continued)

*Primary Examiner* — James M Hannett
(74) *Attorney, Agent, or Firm* — Renner, Otto, Boisselle & Sklar, LLP

(57) ABSTRACT

An imaging apparatus is capable of performing a normal imaging operation of capturing a subject image to generate image data and a dark subtraction operation of performing a dark subtraction on the image data to generate repaired image data. The imaging apparatus includes: an image sensor configured to generate image data during the normal imaging operation when a shutter is opened under a predetermined photographing condition; a recorder configured to record the image data and photographing condition data indicating the photographing condition in a recording medium; and a controller configured to control the image sensor. The controller performs the normal imaging operation a plurality of times, and then performs the dark subtraction operation on each piece of image data using a dark image corresponding to each photographing condition.

13 Claims, 12 Drawing Sheets

(51) Int. Cl.
    *H04N 23/62*        (2023.01)
    *H04N 23/667*     (2023.01)
    *H04N 23/71*       (2023.01)

(56)                References Cited

U.S. PATENT DOCUMENTS

| | | | | |
|---|---|---|---|---|
| 9,369,646 B2 * | 6/2016 | Ku | ......................... | H04N 25/63 |
| 2009/0262224 A1 * | 10/2009 | Sambongi | .............. | H04N 23/81 |
| | | | | 348/E9.037 |
| 2013/0033625 A1 * | 2/2013 | Kato | .................... | H04N 25/673 |
| | | | | 348/E5.081 |

FOREIGN PATENT DOCUMENTS

| | | | |
|---|---|---|---|
| JP | 2009-076978 A | | 4/2009 |
| JP | 2010-056868 A | | 3/2010 |
| JP | 2013-106185 A | | 5/2013 |
| JP | 2014-082698 A | | 5/2014 |
| JP | 2016187125 A | * | 10/2016 |

OTHER PUBLICATIONS

English translation of JP-2007300189-A, Negishi, 2007 (Year: 2007).*

* cited by examiner

-ISO SENSITIVITY
-SHUTTER SPEED
-SENSOR TEMP.

2 0 0

2 1 2

2 1 4

2 2 0

1 0 0

IMAGING APPARATUS AND IMAGING SYSTEM

CROSS REFERENCE TO RELATED APPLICATION

This application claims benefit of priority to Japanese Patent Application 2023-079508, filed on May 12, 2023, the entire content of which is incorporated herein by reference.

BACKGROUND

Technical Field

The present disclosure relates to an imaging apparatus and an imaging system.

Related Art

When a night scene, a firework, a starry sky, or the like is photographed by a digital camera, long-time exposure may be performed. When photographing is performed with long-time exposure, shading due to point defects and dark current of the image sensor increases, and deterioration of the image quality of a photographed image occurs.

As a countermeasure against such image quality deterioration, what is called "dark frame subtraction" or "dark subtraction" is known. In general, "dark subtraction" refers to the processing of capturing a subject image to acquire a main image, then further photographing an image with the shutter closed for the same exposure time to acquire a dark image, and subtracting the dark image from the main image.

When the dark image is acquired immediately after the main image is acquired, there is a possibility that a photo opportunity is missed during a period until the dark image is acquired. Therefore, J P 2009-76978 A discloses a technique of acquiring a dark image in advance before acquiring a main image and performing dark subtraction immediately after acquiring the main image.

SUMMARY

In JP 2009-76978 A, when the main image is acquired after a lapse of a predetermined time or more from the acquisition of the dark image, it is determined that the imaging condition has changed, and the dark subtraction is not performed. That is, the deterioration of the image quality is not solved.

An object of the present disclosure is to provide an imaging apparatus and an imaging system capable of performing dark subtraction without missing a photo opportunity.

In the present disclosure, the imaging apparatus can perform a normal imaging operation of capturing a subject image to generate image data, and a dark subtraction operation of performing dark subtraction on the image data to generate repaired image data. The imaging apparatus includes an image sensor, a recorder, and a controller. The image sensor generates image data during the normal imaging operation when a shutter is opened under a predetermined photographing condition. The recorder records image data and photographing condition data indicating photographing conditions on a recording medium. The controller controls the image sensor. Furthermore, after performing the normal imaging operation a plurality of times, the controller performs the dark subtraction operation on each piece of image data using the dark image corresponding to each photographing condition.

In the present disclosure, an imaging system includes an imaging apparatus and a server device that can communicate with each other. The imaging apparatus includes an image sensor, a recorder, a controller, a user interface, and a first communication circuit. The image sensor generates image data during the normal imaging operation when a shutter is opened under a predetermined photographing condition. The recorder records image data and photographing condition data indicating photographing conditions on a recording medium. The controller controls the image sensor. The user interface receives a designation from the user to perform the dark subtraction operation in cooperation with the server device. The first communication circuit transmits a photographing condition and designation. The server device includes a second communication circuit and a server controller. The second communication circuit receives a photographing condition and designation. The server controller determines a dark image to be used for image data based on a photographing condition. The server controller determines a dark image based on a photographing condition from the imaging apparatus. Then, one of the imaging apparatus and the server device performs a dark subtraction operation of performing dark subtraction on the image data to generate repaired image data.

According to an exemplary embodiment of the present disclosure, an imaging apparatus and an imaging system capable of performing dark subtraction without missing a photo opportunity are provided.

DETAILED DESCRIPTION

Hereinafter, embodiments will be described with reference to the drawings as appropriate. However, a detailed description more than necessary may be omitted. For example, a detailed description of already well-known matters and a redundant description of substantially the same configuration may be omitted. This is to avoid the unnecessary redundancy of the following description and to facilitate understanding by those skilled in the art.

It should be noted that the inventor(s) provides the accompanying drawings and the following description for those skilled in the art to fully understand the present disclosure, and does not intend to limit the claimed subject matter by these.

1. First Embodiment

In the first embodiment, a digital camera capable of capturing an image of a subject and recording moving image data will be described as an example of an imaging apparatus according to the present disclosure.

1-1. Configuration Example of Digital Camera

Figure 1:
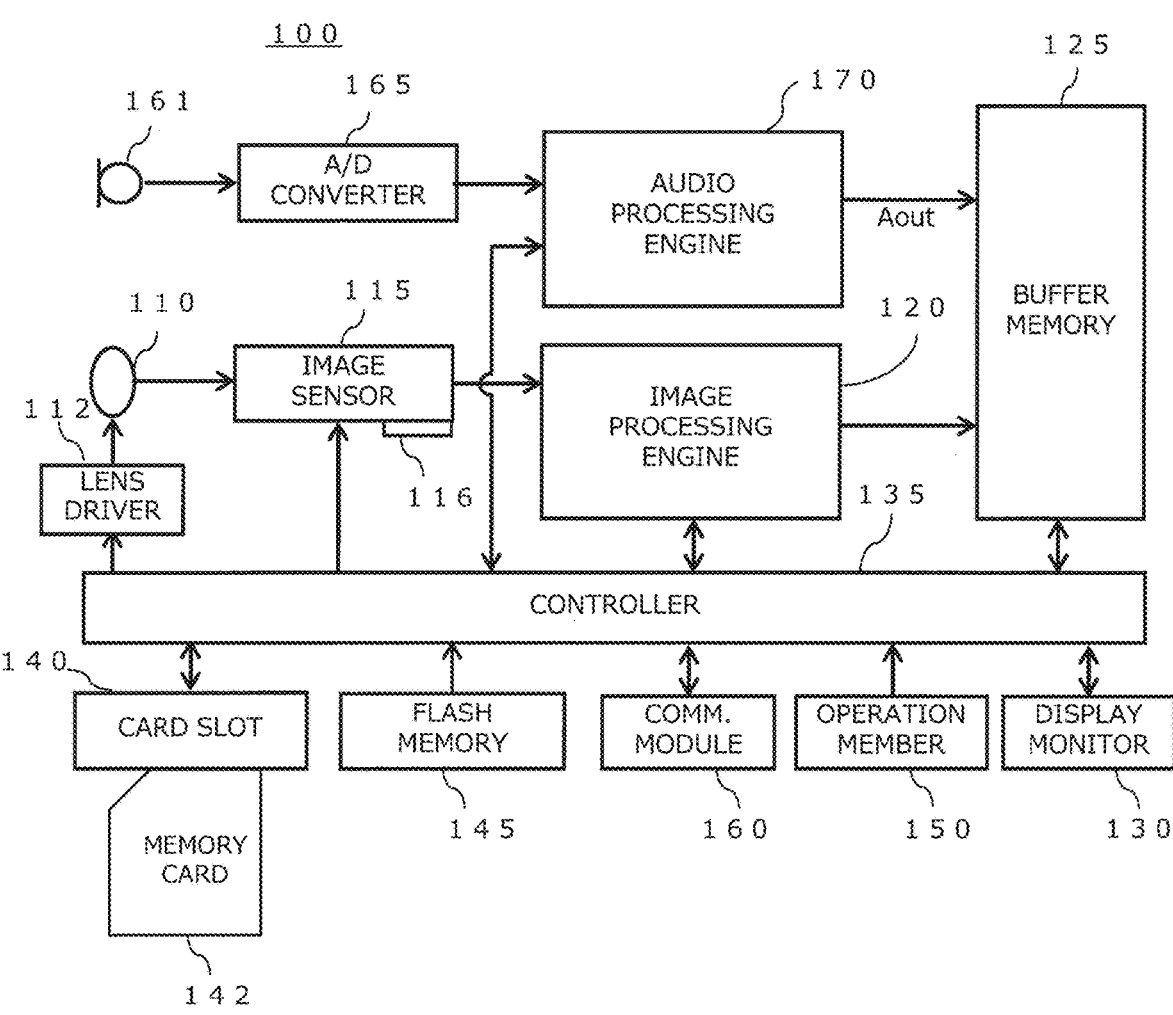
FIG. 1 is a hardware configuration diagram of a digital camera according to a first exemplary embodiment of the present disclosure.

FIG. 1 is a hardware configuration diagram of a digital camera 100 according to the present embodiment. The digital camera 100 illustrated in FIG. 1 is, for example, a single-lens type digital camera or a compact-type digital camera. Hereinafter, an overview of the components of the digital camera 100 will be described.

The digital camera 100 according to the present embodiment includes an image sensor 115, a temperature sensor 116, an image processing engine 120, a display monitor 130, and a controller 135. Furthermore, the digital camera 100 includes a buffer memory 125, a card slot 140, a flash memory 145, an operation member 150, and a communication module 160. In addition, the digital camera 100 includes an optical system 110 and a lens driver 112. The digital camera 100 further includes a microphone 161, a microphone analog/digital (A/D) converter 165, and an audio processing engine 170.

The optical system 110 includes a focus lens, a zoom lens, a diaphragm, a shutter, and the like. The focus lens is a lens configured to change the focus state of a subject image formed on the image sensor 115. The zoom lens is a lens configured to change the magnification of the subject image formed by the optical system. Each of the focus lens and the like is configured using one or a plurality of lenses.

The lens driver 112 drives the focus lens and the like in the optical system 110. The lens driver 112 includes a motor and moves the focus lens along an optical axis of the optical system 110 under the control of the controller 135. A configuration for driving the focus lens in the lens driver 112 can be implemented with a DC motor, a stepping motor, a servo motor, an ultrasonic motor, or the like.

It should be noted that when the digital camera 100 is a single-lens type digital camera, the optical system 110 and the lens driver 112 are housed in a lens barrel (not shown). The lens barrel may be attachable to and detachable from the digital camera 100.

The image sensor 115 captures a subject image formed through the optical system 110 to generate imaging data. The imaging data constitutes image data indicating a captured image by the image sensor 115. The image sensor 115 generates image data of a new frame at a predetermined frame rate (for example, 60 frames/sec). The generation timing of the imaging data and the electronic shutter operation in the image sensor 115 are controlled by the controller 135. As the image sensor 115, various image sensors such as a CMOS image sensor, a CCD image sensor, or an NMOS image sensor can be used.

The image sensor 115 performs imaging operations of a moving image and a still image, an imaging operation of a through image, and the like. The through image is mainly a moving image, and is displayed on the display monitor 130 in order for the user to determine composition for capturing, for example, a still image. Each of the through image, the moving image, and the still image is an example of the captured image in the present embodiment. The image sensor 115 is an example of an imaging unit in the present embodiment.

The digital camera 100 can receive external light incident through an optical system such as the lens 110 with the image sensor 115, acquire an image with 4K resolution, and perform processing such as display and recording. The "image with 4K resolution" is, for example, an image of 4096 pixels×2160 pixels or 3840 pixels×2160 pixels. In the present specification, the "image" may include any of a moving image and a still image.

The temperature sensor 116 is provided in contact with or in the vicinity of the image sensor 115, and detects the temperature of the image sensor 115.

The image processing engine 120 performs various types of processing on imaging data output from the image sensor 115 to generate image data or performs various types of processing on image data to generate an image to be displayed on the display monitor 130. Examples of the various types of processing include white balance correction, gamma correction, YC conversion processing, electronic zoom processing, compression processing, decompression processing, and the like, but are not limited thereto. The image processing engine 120 may be configured using a hard-wired electronic circuit or may be configured using a microcomputer, a processor, or the like using a program.

The display monitor 130 is a device capable of displaying various types of information and may be, for example, a liquid crystal display device or an organic EL device.

The operation member 150 is a general term for hard keys such as operation buttons and operation levers provided on the exterior of the digital camera 100 and receives an operation by a user. The operation member 150 includes, for example, a release button, a mode dial, a touch panel, a cursor button, and a joystick. When receiving an operation by the user, the operation member 150 transmits an operation signal corresponding to the user's operation to the controller 135.

The controller 135 includes a CPU and the like, and the CPU executes a program (software) to implement processing and functions according to the present disclosure. The controller 135 may include, instead of the CPU, a processor including a dedicated electronic circuit designed to implement a predetermined function. That is, the controller 135 can be implemented by various processors such as a CPU, an MPU, a GPU, a DSU, an FPGA, and an ASIC. The controller 135 may include one or more processors. In addition, the controller 135 may include one semiconductor chip together with the image processing engine 120, the audio processing engine 170, and/or the like. In the present specification, the controller 135 may also be referred to as a "control circuit".

The buffer memory 125 is a recording medium that functions as a work memory of the image processing engine 120 and the controller 135. The buffer memory 125 is implemented by a dynamic random access memory (DRAM) or the like. The flash memory 145 is a nonvolatile recording medium. Although not shown, the controller 135 may include various internal memories, and for example, may incorporate a ROM. The ROM stores various programs to be executed by the controller 135. In addition, the controller 135 may incorporate a RAM that functions as a work area of the CPU.

The card slot 140 is a means into which a detachable memory card 142 is inserted. The card slot 140 can electrically and mechanically connect the memory card 142. The memory card 142 is an external memory including a recording element such as a flash memory inside. The memory card 142 can store data such as image data generated by the image processing engine 120.

The communication module 160 is a communication circuit that performs communication conforming to the communication standard IEEE 802.11, the Wi-Fi standard, or the like and/or communication conforming to a standard such as 4G or 5G. The digital camera 100 can communicate with other apparatuses through the communication module 160. The digital camera 100 may directly communicate with other apparatuses through the communication module 160, or may communicate via an access point. The communication module 160 may be connectable to a communication network such as the Internet.

The microphone 161 includes one or more microphone elements built in the digital camera 100. The microphone 161 converts sound collected by the microphone element into an analog signal that is an electric signal and outputs the analog signal. It should be noted that the microphone 161 may include a microphone element outside the digital camera 100.

The microphone A/D converter 165 converts an analog signal from the microphone 161 into audio data of a digital signal. The audio processing engine 170 receives audio data output from an audio acquisition unit such as the microphone A/D converter 165 and performs various types of audio processing on the received audio data.

1-2. Operation

1-2-1. Example of Acquiring Dark Image According to Individual Photographing Condition The digital camera 100 according to the present disclosure can perform a normal imaging operation of capturing a subject image to generate image data, and a dark subtraction operation of performing dark subtraction on the image data to generate repaired image data.

The dark subtraction is a technique of removing point defects or white blemishes of the image sensor 115, brightness unevenness due to dark current, that is, noise generated by shading. Specifically, the dark subtraction is performed by subtracting dark image data including only noise from image data obtained by photographing the subject image by the normal photographing operation. The noise increases as the ISO sensitivity increases, as the shutter speed decreases, and as the sensor temperature increases. Therefore, the dark subtraction is effective for improving the image quality of an image captured by performing exposure for a long time such as 4 seconds to 60 seconds in a dark place such as a night scene or a starry sky.

Figure 2:
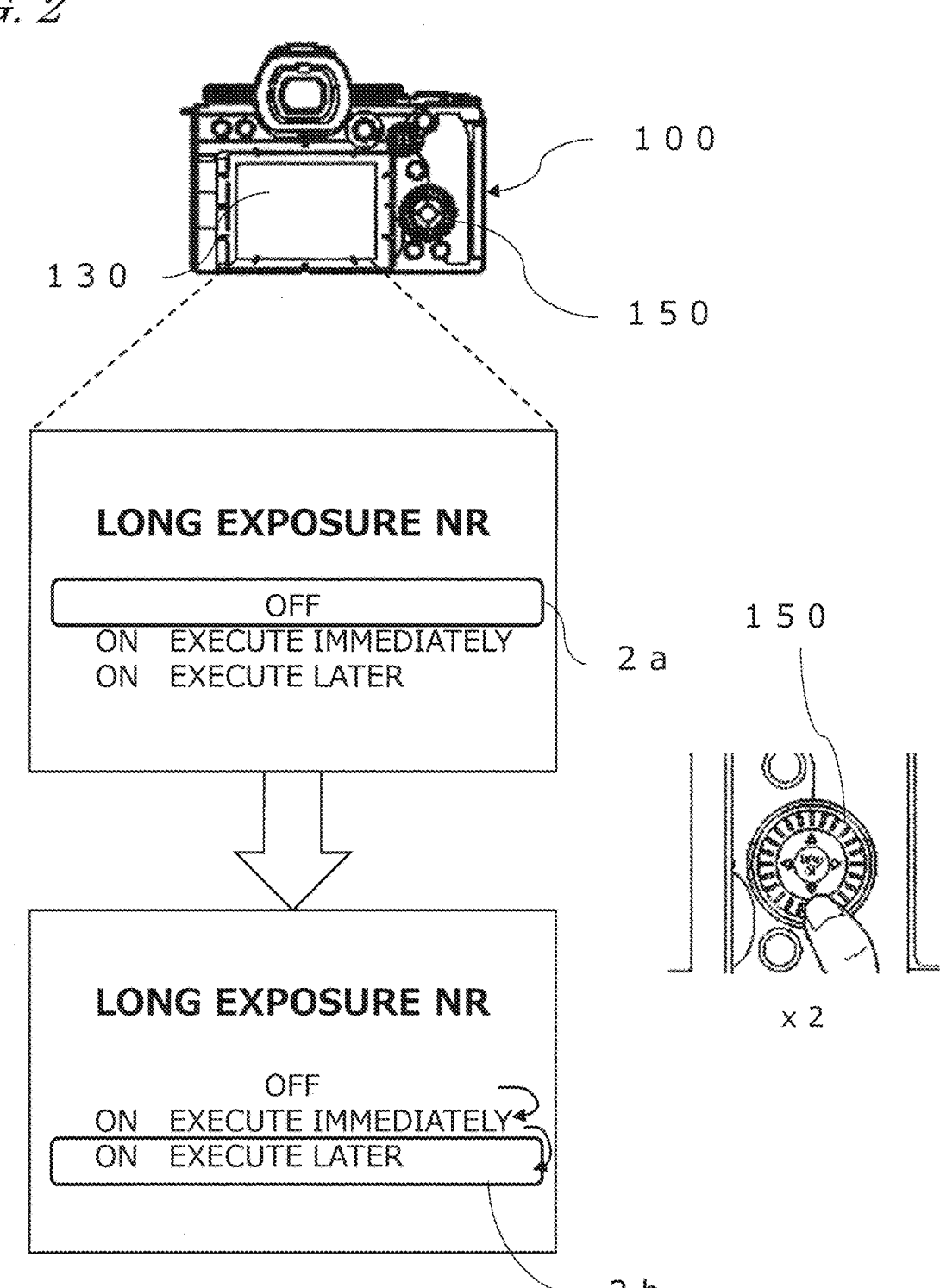
FIG. 2 is a diagram showing an example of a menu setting screen displayed on a display monitor of the digital camera.

In the digital camera 100 according to the present disclosure, the user can set the execution timing of the dark subtraction through a menu. For example, FIG. 2 shows an example of a menu setting screen displayed on the display monitor 130 of the digital camera 100. In the example in FIG. 2, the dark subtraction is shown as "long exposure noise reduction" or "long exposure NR".

The user operates the operation member 150 to select an item 2b indicating "ON: execute later" from an item 2a indicating "OFF" of the long exposure NR. Here, "execute later" means that the dark subtraction operation is performed at the time of the non-photographing operation after the digital camera 100 finishes the normal imaging operation, for example, after the photographing mode is finished. For example, the dark subtraction operation is executed at a timing when the power is turned off after a plurality of times of the normal imaging operation is ended. In the present embodiment, the digital camera 100 does not take the same time to acquire a dark image every time the normal imaging operation is performed once. Accordingly, the user does not miss a photo opportunity, and the convenience of the digital camera 100 can be enhanced.

After the end of the normal imaging operation, the controller 135 of the digital camera 100 acquires dark image data under the same condition as or a sufficiently close condition to the imaging condition of each piece of image data acquired by the normal imaging operation to perform the dark subtraction operation. Since whether the dark subtraction operation is performed or not performed does not depend on the condition, the user can obtain image data with improved image quality by the dark subtraction operation.

Next, the operation of the digital camera 100 will be described in detail with reference to FIGS. 3 to 5. As a premise of the description, it is assumed that the user operates the operation member 150 to select the item 2b indicating "ON: execute later" of the long exposure NR.

Figure 3:
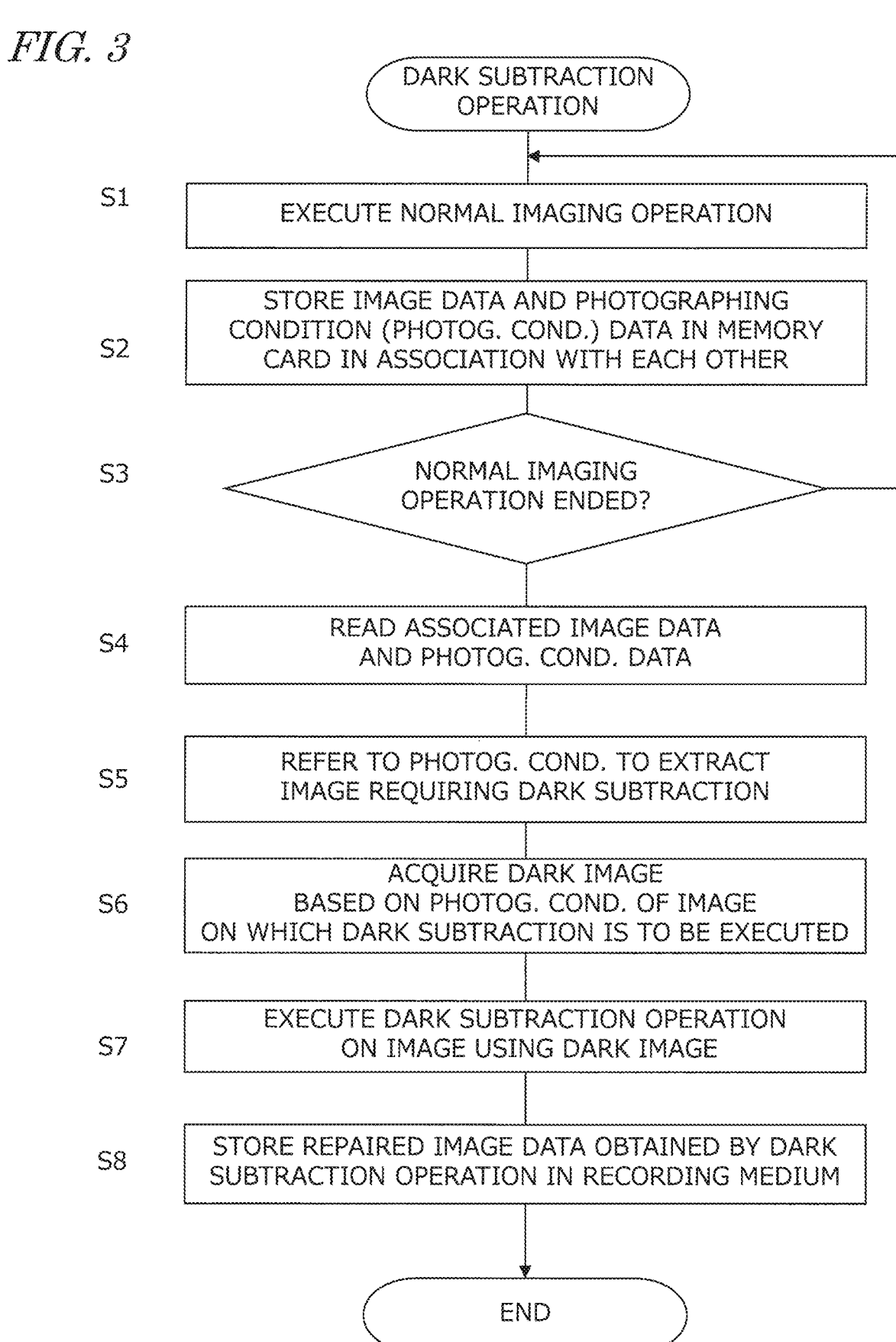
FIG. 3 is a flowchart illustrating a procedure of the dark subtraction operation in the digital camera of the first embodiment.

FIG. 3 is a flowchart illustrating a procedure of the dark subtraction operation in the digital camera 100 of the present embodiment. Each piece of processing of the present flowchart is executed by the controller 135 and by an image engine or the like that receives an instruction from the controller 135. FIG. 4 is a diagram for illustrating a timing at which the dark subtraction operation is executed.

First, the controller 135 executes a normal imaging operation by a user's operation such as depressing a shutter button received through the operation member 150 (S1). Accordingly, the image processing engine 120 generates image data. The controller 135 stores the image data and the photographing condition data in the memory card 142 in association with each other (S2). The controller 135 repeats steps S1 and S2 until the normal imaging operation is ended (S3).

Figure 4:
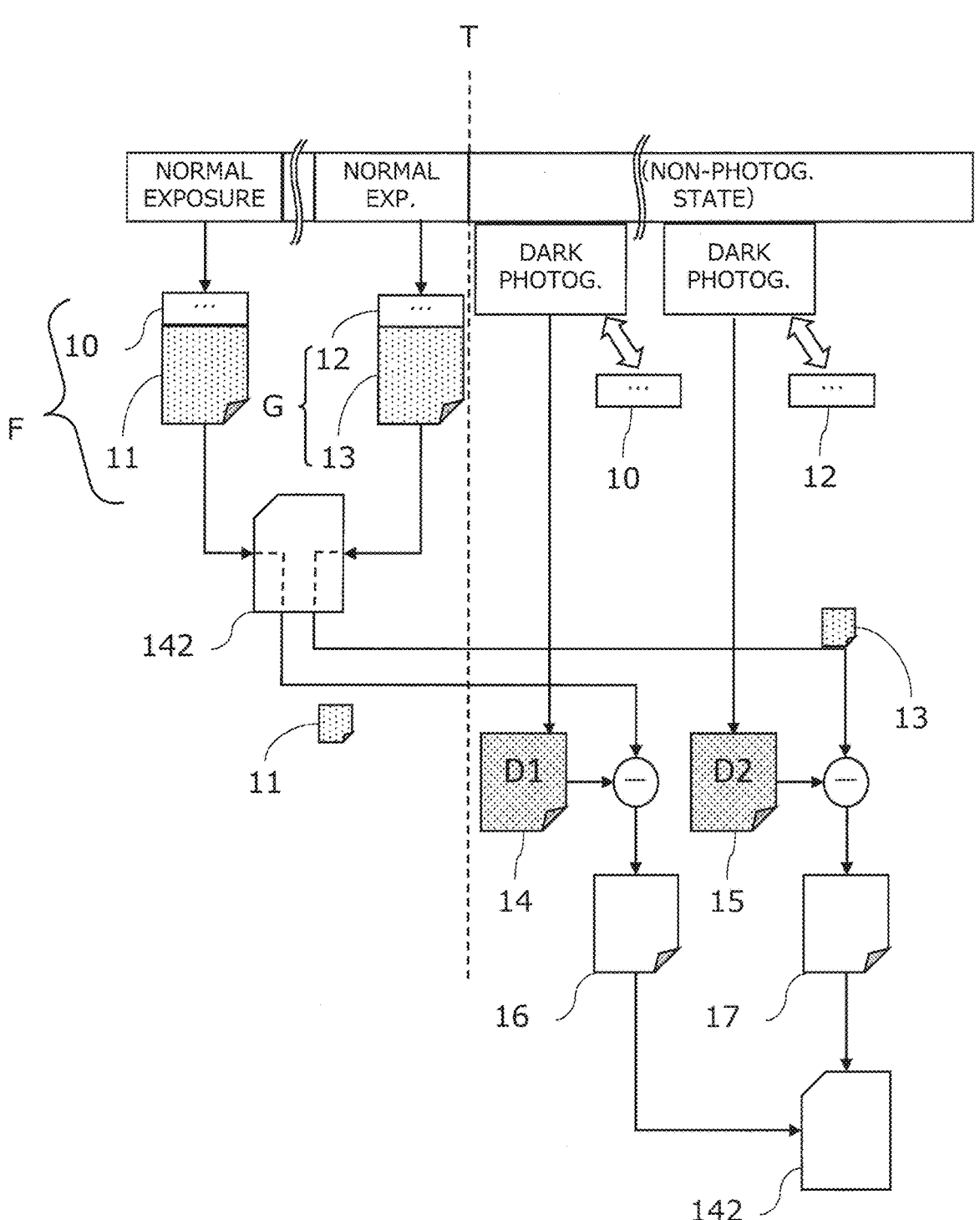
FIG. 4 is a diagram for illustrating a timing at which the dark subtraction operation is executed.

In FIG. 4, a period until the time T indicates the normal imaging operation. For example, normal exposure is performed in the first photographing, and the image file F including the photographing condition data 10 and the image data 11 is acquired.

Figure 5:
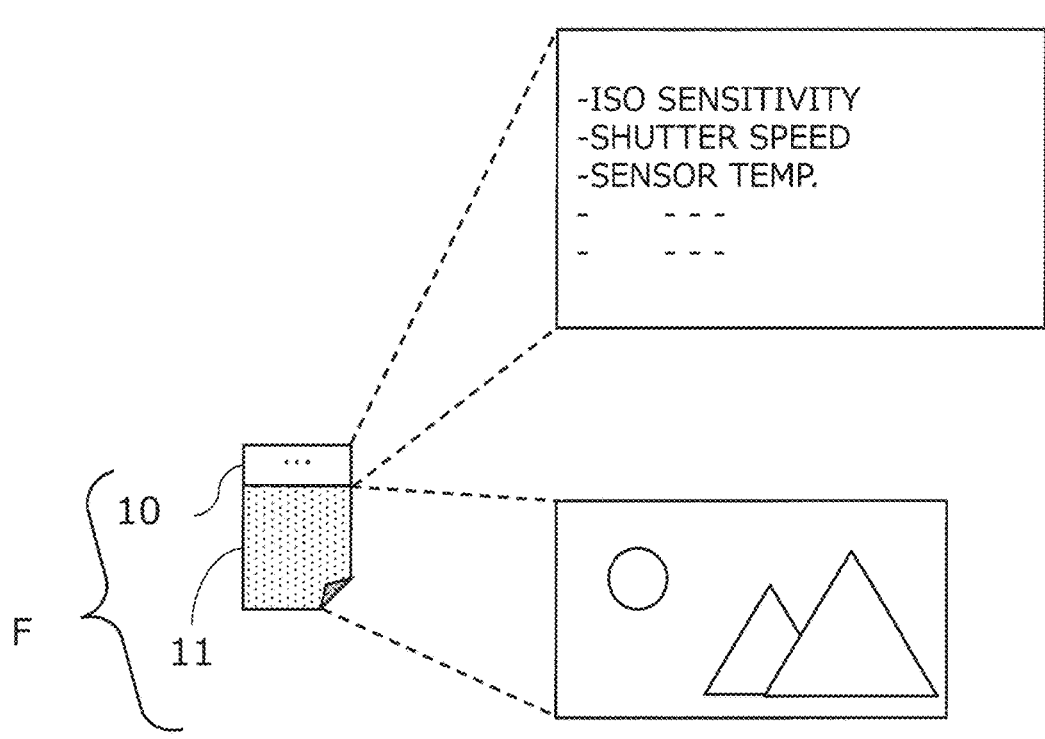
FIG. 5 is a diagram showing an example of a data structure of an image file.

FIG. 5 shows an example of a data structure of the image file F. In the present embodiment, the photographing condition data 10 describes the ISO sensitivity, the shutter speed, and the temperature of the image sensor 115 measured by the temperature sensor 116 at the time of the normal imaging operation. The shutter speed represents a shutter closing speed, in other words, an exposure time. The photographing condition data 10 may further include photographing conditions such as photographing date and time, the manufacturer name of the digital camera 100, resolution of the entire image, resolution per unit in the horizontal and vertical directions, an aperture (f-number), and a focal length.

The photographing condition data 10 is described in conformity with, for example, an exchangeable image file format (Exif) standard. The image data 11 is data conforming to a known image format such as JPEG, TIFF, or PNG. In the present embodiment, embedding the photographing condition data 10 in the image data 11 in conformity with the Exif standard is referred to as the association of the image data and the photographing condition data. It should be noted that if the image data and the photographing condition data are associated on a one-to-one basis, it is not essential to use the Exif standard, and it is not essential to embed the photographing condition data 10 in the image data 11, either.

As shown in FIG. 4, the image file F acquired by the normal imaging operation is stored in the memory card 142. Similarly, the image file G acquired by the subsequent normal imaging operation is also similarly stored in the memory card 142, for example, every time photographing is performed. Since the normal imaging operation can be continuously performed, the user does not miss a photo opportunity.

Refer again to FIG. 3. If detecting the end of the normal imaging operation, the controller 135 proceeds to the next processing (S4). For example, the controller 135 detects the end of the normal imaging operation by a transition to the non-photographing mode such as a user's operation to turn off the digital camera 100 or to change the operation mode to the reproduction mode.

The controller 135 reads the associated image data and photographing condition data from the memory card 142 (S4) and refers to the photographing condition in the photographing condition data to extract an image requiring dark subtraction (S5).

For example, the flash memory 145 of the digital camera 100 retains in advance threshold conditions of the ISO sensitivity for performing the dark subtraction operation, the shutter speed, and/or the temperature of the image sensor 115. When the controller 135 refers to the threshold condition in the flash memory 145 and determines that at least one of the photographing conditions of the photographing condition data 10 satisfies the threshold condition, the controller 135 extracts an image photographed under the photographing condition as an image that requires dark subtraction. The controller 135 assigns an uncorrected flag indicating a target of the dark subtraction operation to the extracted image file. It should be noted that, in addition to or instead of extracting the image based on the threshold condition, the controller 135 may receive an image that requires dark subtraction from the user and assign an uncorrected flag.

Next, the controller 135 acquires a dark image based on a photographing condition of an image on which dark subtraction is to be executed (S6). For example, the controller 135 refers to the photographing condition data of the image file to which the uncorrected flag is assigned and executes the imaging operation in a state where the shutter is closed for the exposure time corresponding to the same ISO sensitivity and shutter speed as the photographing condition. Accordingly, a dark image for correcting the image is acquired.

Thereafter, the controller 135 executes a dark subtraction operation on the image using the dark image (S7). Specifically, the controller 135 subtracts the luminance value of each pixel constituting the dark image from the luminance value of each pixel constituting the image. The image obtained by the subtraction and its image data are hereinafter referred to as a "repaired image" and "repaired image data".

The controller 135 stores the repaired image data obtained by the dark subtraction operation in the recording medium (S8).

The steps S4 to S8 described above will be described with reference to FIG. 4. Let the target of the dark subtraction operation be the image files F and G. It should be noted that in the image file G, the photographing condition data 12 and the image data 13 are associated with each other.

At time T, the controller 135 detects the end of the normal imaging operation. The controller 135 refers to each of the pieces of the photographing condition data 10 and 12 to perform photographing for acquiring a dark image, that is, dark photographing.

At the time of the dark photographing operation at and after the time T, the digital camera 100 is in a non-photographing state after the normal photographing operation is finished. For example, the state is a state in which the power of the digital camera 100 is turned off or a state of an image reproduction mode. Therefore, it can be said that the user does not intend to photograph. Therefore, it is not necessary to assume a loss of a photo opportunity due to dark photographing.

It should be noted that, in the above example, it has been described that with reference to the photographing condition data 10 and the like, the imaging operation is performed in a state where the shutter is closed for the exposure time corresponding to the same ISO sensitivity and shutter speed as the photographing condition. However, when dark photographing is performed by matching more photographing conditions, improvement of the image quality by dark subtraction is more remarkably implemented. For example, when the value of the temperature of the image sensor 115 is described in the photographing condition data 10 or the like, it is preferable to perform dark photographing under a condition that is the same as or sufficiently close to the temperature. The sufficiently close condition is, for example, within a range of ±1 degree of the temperature value of the image sensor 115 at the time of photographing.

The controller 135 suspends the dark photographing operation until the temperature of the controller 135 that rises by operating the digital camera 100 rises and reaches, for example, the value of the temperature of the image sensor 115 described in the photographing condition data 10. When the temperature of the controller 135 matches the photographing condition data 10, the dark subtraction operation is executed at that point. Accordingly, high correction accuracy can be achieved.

The dark image data D1 and D2 are sequentially obtained by the dark photographing. The controller 135 acquires the repaired image data 16 by subtracting the image data 14 of the dark image D1 from the image data 11. The controller 135 stores the repaired image data 16 in the memory card 142. Similarly, the controller 135 acquires the repaired image data 17 by subtracting the image data 15 of the dark image D2 from the image data 13 and stores the repaired image data 17 in the memory card 142.

It should be noted that the image data 11 may be left stored in the memory card 142 or may be deleted. In addition, by embedding the photographing condition data 10 in the repaired image data 16 and embedding the photographing condition data 12 in the repaired image data 17, each image file may be stored in the memory card 142.

1-2-2. Example of Commonizing Dark Image

In the example shown in FIG. 4, for each normal exposure, dark photographing was performed at and after the time T to generate a dark image. However, when photographing conditions of a plurality of normal exposures match or are sufficiently close to each other, it may be done with only one-time dark photographing.

Figure 6:
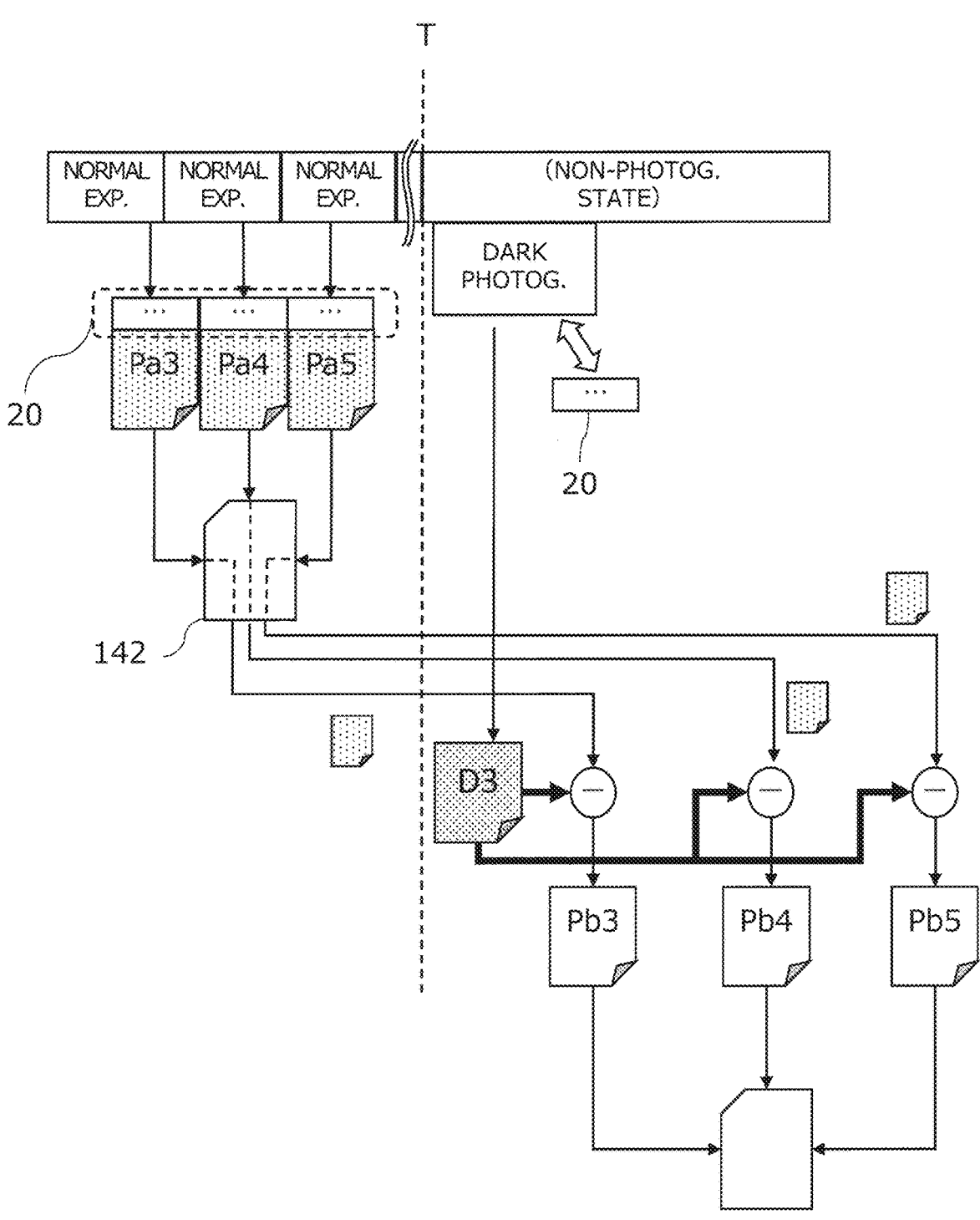
FIG. 6 is a diagram for illustrating a procedure of the dark subtraction operation when a plurality of times of the normal imaging operation in which the photographing conditions match is performed.

FIG. 6 is a diagram for illustrating a procedure of the dark subtraction operation when a plurality of times of the normal imaging operation in which the photographing conditions match is performed. As the plurality of times of the normal imaging operation in which the photographing conditions match, for example, it is conceivable that the starry sky is imaged a plurality of times while the ISO sensitivity and the shutter speed are fixed.

Images Pa3 to Pa5 are acquired by a plurality of times of imaging, and stored in the memory card 142 with photographing condition data associated with each of the images. Thereafter, at time T, the controller 135 detects the end of the normal imaging operation.

Next, the controller 135 determines if other photographing conditions except for the photographing time, for example, both the ISO sensitivity and the shutter speed match. FIG. 6 shows that the photographing condition data 20 is common among the images Pa3 to Pa5. When it is determined that the other photographing conditions except for the photographing time match, the controller 135 performs dark photographing once at and after the time T to acquire the dark image D3. Thereafter, the controller 135 performs dark subtraction on the images Pa3 to Pa5 using the acquired dark image D3 to acquire repaired images Pb3 to Pb5.

Even when the plurality of photographing conditions do not completely match but are sufficiently close to each other, it can be done with only one-time dark photographing. For example, when the exposure time corresponding to the shutter speed falls within ±10% of the median value, the controller 135 only needs to acquire the dark image D3 by performing one-time dark photographing with the exposure time of the median value.

According to the present example, the dark image D3 acquired by one-time dark photographing is shared to perform the dark subtraction. Accordingly, the time required for dark photographing can be shortened, thereby preventing heat generation due to operation, and consumption of a battery (not shown).

1-2-3. Mixing of an Example of Acquiring a Dark Image According to Individual Photographing Conditions and an Example of Sharing a Dark Image The controller 135 of the digital camera 100 can also operate by combining the examples of the items 1-2-1 and 1-2-2.

Figure 7:
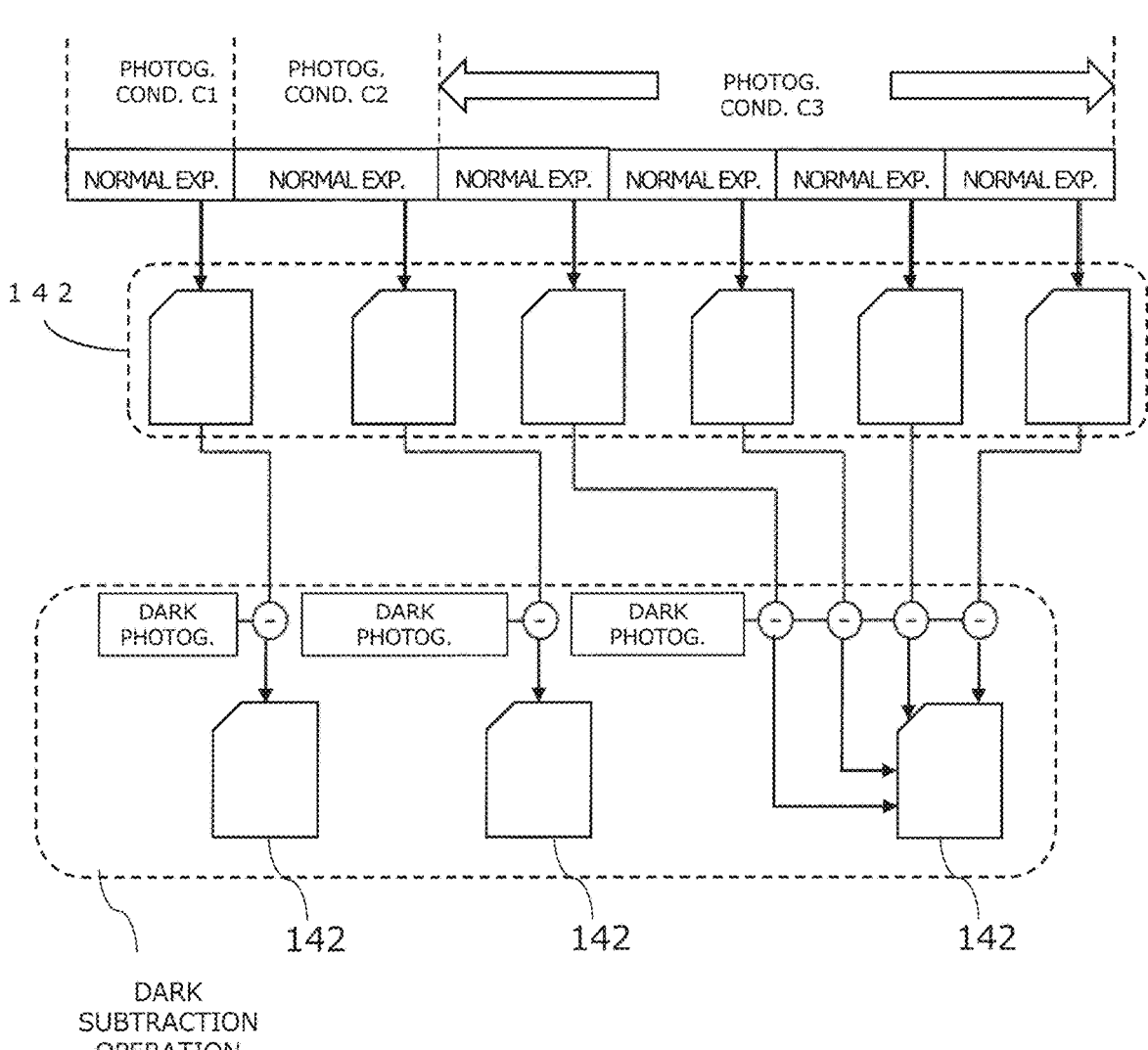
FIG. 7 is a diagram for illustrating a method of executing dark photographing when photographing conditions do not match and do match.

FIG. 7 is a diagram for illustrating a method of executing dark photographing when photographing conditions do not match and do match. Examples in which normal exposure is performed under three kinds of photographing conditions C1, C2, and C3 during the normal imaging operation to capture a subject image will be given. Among them, it is assumed that one normal exposure is performed under each of the photographing conditions C1 and C2, and four normal exposures are performed under the photographing condition C3. After each normal exposure, the image data and the photographing condition data are stored in association with each other in the memory card 142.

The overview of the dark subtraction operation is shown in a broken line in FIG. 7. It should be noted that for convenience of description, the description is different from those in FIGS. 4 and 6.

For the images obtained in the first two normal imaging operations, the controller 135 performs dark photographing under the respective photographing conditions C1 and C2 to acquire separate dark images, and performs dark subtraction using the respective dark images. On the other hand, for four images obtained in the third and subsequent normal imaging operations, the controller 135 performs dark photographing under the imaging condition C3 to acquire one dark image, and performs dark subtraction using the dark image. The controller 135 stores the repaired image data after each dark subtraction in the memory card 142.

As in the examples of the items 1-2-1 to 1-2-3 described above, dark photographing may be performed a plurality of times, once, or a combination thereof according to photographing conditions. Accordingly, it is possible to suppress the time required for dark photographing, the processing capacity to be used, heat generation, and consumption of the battery while performing dark subtraction suitable for the image obtained by the normal imaging operation.

It should be noted that the controller 135 may accumulate the data of the dark image acquired by dark photographing in, for example, the memory card 142 and/or the flash memory 145 in association with the photographing condition data. When dark photographing is performed under photographing conditions to be matched later, the stored dark image data can be read to perform dark subtraction. Since the dark photographing can be omitted, the dark subtraction operation can be quickly performed.

It should be noted that instead of performing the above-described dark photographing to accumulate the dark image, a manufacturer of the digital camera 100 may accumulate the dark image in advance under various photographing conditions. Since it is not necessary to perform dark photographing, the convenience of the user can be enhanced.

However, by continuing the use of the digital camera 100, degradation of the image sensor 115 may progress due to ultraviolet rays or the like. For example, several tens of white flaws may occur in the image sensor 115 in one year. When a dark image is acquired and stored in advance, the influence of white flaws caused by aging cannot be excluded. Therefore, for example, the dark image may be updated by periodically performing dark photographing, for example, once a year. Accordingly, the image quality can be improved by performing the dark subtraction on the image obtained by the normal imaging operation.

1-2-4. Generation of Dark Image by Calculation

In the example described so far, in principle, the digital camera 100 performs dark photographing to acquire a dark image. Since dark photographing requires time and power, it is preferable that dark photographing can be omitted. Therefore, the inventors of the present application have studied the method and led to implementing a method of generating a dark image by calculation.

Figure 8:
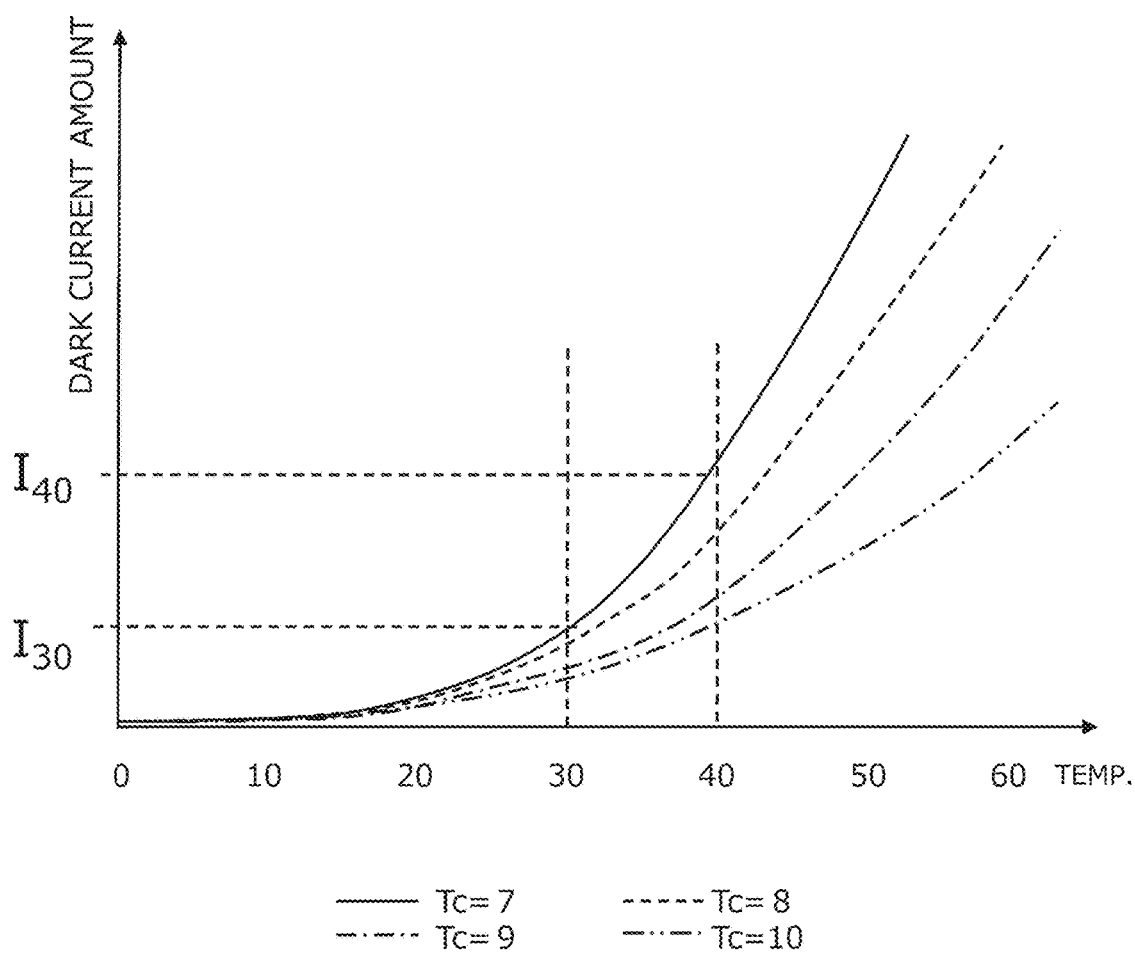
FIG. 8 is a graph showing a temperature characteristic of a dark current of the image sensor.

FIG. 8 is a graph showing a temperature characteristic of a dark current of the image sensor 115. The horizontal axis represents the temperature, and the vertical axis represents the dark current amount. As shown in FIG. 8, the dark current amount of the image sensor 115 such as a photodiode increases exponentially with respect to temperature. For example, it is said that the dark current amount increases 2 times every 8° C. or increases 2 times every 10° C. FIG. 8 shows four types of curves corresponding to the values of the four types of temperature coefficients Tc. Specifically, each curve is expressed by the following formula using the temperature coefficient Tc as a parameter.

$$I_t = I_0 \times 2^{\frac{t}{Tc}} \qquad \text{[Mathematical 1]}$$

where the letters in the mathematical formula are defined as follows.

t: Temperature of image sensor 115

It: Dark current amount at temperature t. $I_0$ represents a dark current amount at t=0 (degrees).

Tc: Temperature coefficient

It should be noted that dark current/temperature characteristics of the image sensor 115 differ depending on the characteristics of each device, a used voltage, and the like. When a more accurate temperature coefficient is required, it is preferable to measure temperature characteristics in an actual use environment.

As an example, a curve indicated by a solid line in FIG. 8 will be exemplarily described. The dark current amount when the temperature of the image sensor 115 is 30 degrees is represented as $I_{30}$, and the dark current amount when the temperature is 40 degrees is represented as $I_{40}$.

When two dark images are acquired by matching photographing conditions other than the temperature of the image sensor 115, it can be said that a difference therebetween, that is, a difference in the degree of noise is a difference between the dark current amounts $I_{30}$ and $I_{40}$. Therefore, for example, from a dark image (hereinafter, described as a "reference dark image") acquired at 30 degrees, a rule for obtaining a dark image at 40 degrees of the image sensor 115 can be derived in advance. The rule defines a calculation method of adding the influence (gain) of the difference in the dark current amount on the noise, with the reference dark image as a base. The rule in the case of lower than 30 degrees defines a calculation method of subtracting the influence (gain) of the difference in the dark current amount on the noise, with the reference dark image as a base. It is easy to provide such a rule in advance, and a calculation method thereof is relatively simple. Since complicated control is unnecessary, implementation is easy.

Alternatively, the conversion rule may be one or a pixel-by-pixel conversion rule for calculating a 40-degree dark image from a 30-degree dark image by using each dark image actually acquired when the temperature of the image sensor 115 is 30 degrees and 40 degrees. Similarly, for example, by preparing a rule for each temperature according to the measurement resolution of the temperature sensor 116, a dark image at the temperature can be calculated from the reference dark image with reference to the rule from the temperature of the image sensor 115 acquired as the photographing condition. Furthermore, it is possible to provide a rule according to the temperature for each temperature coefficient and/or for each combination of the ISO sensitivity and the shutter speed under the photographing condition.

As an example of the rule, an example of using a plurality of dark images is also conceivable. For example, it is assumed that a dark image having a temperature of the controller 135 of 30 degrees and a dark image having a temperature of 40 degrees are prepared in advance, and that the temperature of the controller 135 at the time of photographing is 37 degrees is described in the photographing condition data. The controller 135 may calculate the 37-degree dark image by weighting and then averaging the 30-degree dark image and the 40-degree dark image. Also by this method, the time required for dark subtraction can be shortened as compared with the case of performing dark imaging, and high correction accuracy can be implemented.

The manufacturer of the digital camera 100 stores the reference dark image and the rule in, for example, the flash memory 145. When the execution timing of the dark subtraction operation arrives, the controller 135 can generate a dark image from the reference dark image based on a photographing condition of at least one piece of image data generated by the normal imaging operation and a rule stored in advance. Accordingly, the need for the digital camera 100 to capture and store dark images under various photographing conditions is eliminated. Since it is not necessary to perform dark photographing, the convenience of the user can be enhanced.

1-3. Effects and the Like

As described above, in the present embodiment, the digital camera 100, which is an example of an imaging apparatus, can perform a normal imaging operation of capturing a subject image to generate image data, and a dark subtraction operation of performing dark subtraction on the image data to generate repaired image data. The digital camera 100 includes: an image sensor 115 that generates image data during the normal imaging operation when a shutter is opened under a predetermined photographing condition, a card slot 140 (an example of a recorder) that records the image data and photographing condition data indicating the photographing condition in the memory card 142 that is an example of a recording medium, and a controller 135 (an example of a controller) that controls the image sensor. After performing the normal imaging operation a plurality of times, the controller 135 performs the dark subtraction operation on each piece of image data using the dark image corresponding to each photographing condition.

With this configuration, the user of the digital camera 100 does not miss a photo opportunity. Since the digital camera 100 performs the dark subtraction, deterioration of the image quality of the captured image can be solved.

In the present embodiment, the digital camera 100 further includes an operation member 150 (an example of a user interface) that receives the designation of an execution timing of the dark subtraction operation from the user. The execution timing includes a timing different from the timing immediately after the end of the normal imaging operation. Since the dark subtraction operation is not performed immediately after the end of the normal imaging operation, dark photographing is not performed, whereby the user does not miss a photo opportunity.

In the present embodiment, when the execution timing arrives, the controller 135 of the digital camera 100 captures a dark image under the same condition as the photographing condition of at least one piece of image data among a plurality of pieces of image data generated by a plurality of times of normal imaging operation and performs a dark subtraction operation on at least one piece of image data using the captured dark image.

The flash memory 145 (an example of a recorder) retains a reference dark image and a rule for generating a dark image from the reference dark image. When the execution timing of the dark subtraction operation arrives, the controller 135 generates a dark image from the reference dark image based on the photographing condition of at least one piece of image data among the plurality of pieces of image data generated by the plurality of times of normal imaging operation and the rule. Then, the controller 135 performs a dark subtraction operation on at least one piece of image data using the generated dark image. Since it is not necessary to perform dark photographing, the convenience of the user can be enhanced.

In the present embodiment, the flash memory 145 retains image data of a plurality of dark images captured for each of a plurality of photographing conditions. When the execution timing of the dark subtraction operation arrives, based on the photographing condition of at least one piece of image data among the plurality of pieces of image data generated by the plurality of times of normal imaging operation, the controller 135 selects one dark image from the plurality of dark images and performs the dark subtraction operation on the at least one piece of image data using the selected dark image. Since it is not necessary to perform dark photographing, the convenience of the user can be enhanced.

In the present embodiment, the controller 135 determines if the photographing condition of at least one piece of image data meets the condition requiring the dark subtraction, and performs the dark subtraction operation when determining that the photographing condition corresponds to the condition requiring the dark subtraction.

In the present embodiment, when the photographing condition of each of the plurality of pieces of image data is the same, the controller 135 performs the dark subtraction operation on the plurality of pieces of image data using the common dark image. Since it is not necessary to perform dark photographing on all the photographed images, the processing speed is increased, and the convenience of the user can be enhanced.

Second Embodiment

In the first embodiment, the digital camera performs the normal photographing operation and the dark subtraction operation. In the present embodiment, an imaging system including a digital camera and a server device will be described. It should be noted that the configuration of the digital camera according to the present embodiment is the same as the configuration of the digital camera 100 according to the first embodiment. Therefore, a digital camera according to the present embodiment will be described using the same reference numeral 100.

Figure 9:
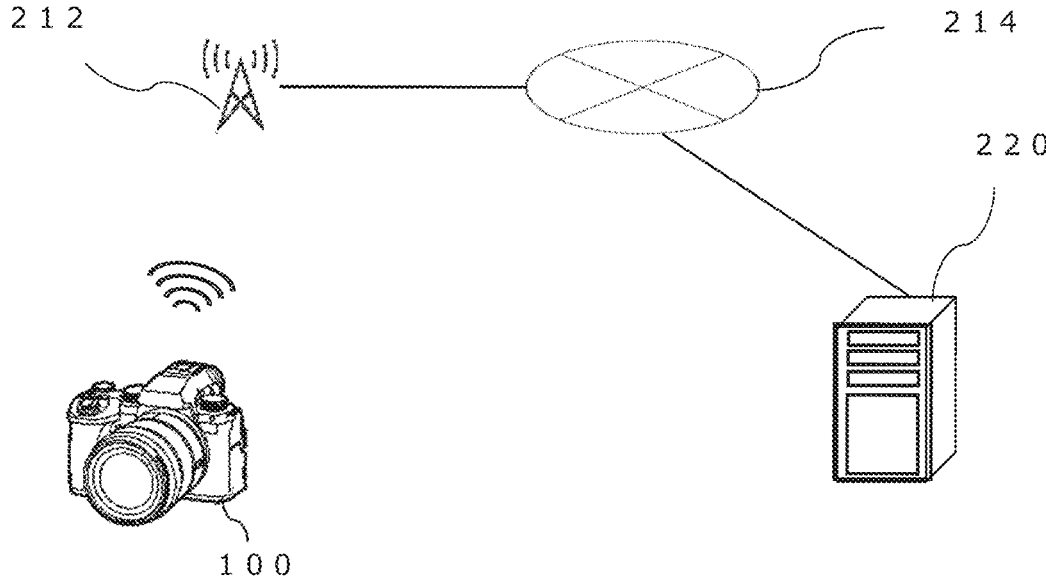
FIG. 9 is a diagram showing a configuration example of an imaging system according to a second exemplary embodiment of the present disclosure.

FIG. 9 shows a configuration example of the imaging system 200 according to the present embodiment. The imaging system 200 includes a digital camera 100 and a server device 220. The digital camera 100 communicates with an external apparatus using a communication module 160. For example, the digital camera 100 can communicate with the server device 220 via the base station 212 for 5G communication and the electric communication line 214 such as the Internet.

Similarly to the first embodiment, the digital camera 100 according to the present embodiment also opens the shutter under a predetermined photographing condition and performs a normal imaging operation to generate image data. Then, the photographing condition data and the image data are recorded in association with each other in the memory card 142.

In the present embodiment, the digital camera 100 receives designation of performing the dark subtraction operation in cooperation with the server device 220 from the user through the operation member 150. Accordingly, the communication module 160 transmits the photographing condition and the designation to the server device 220.

Figure 10:
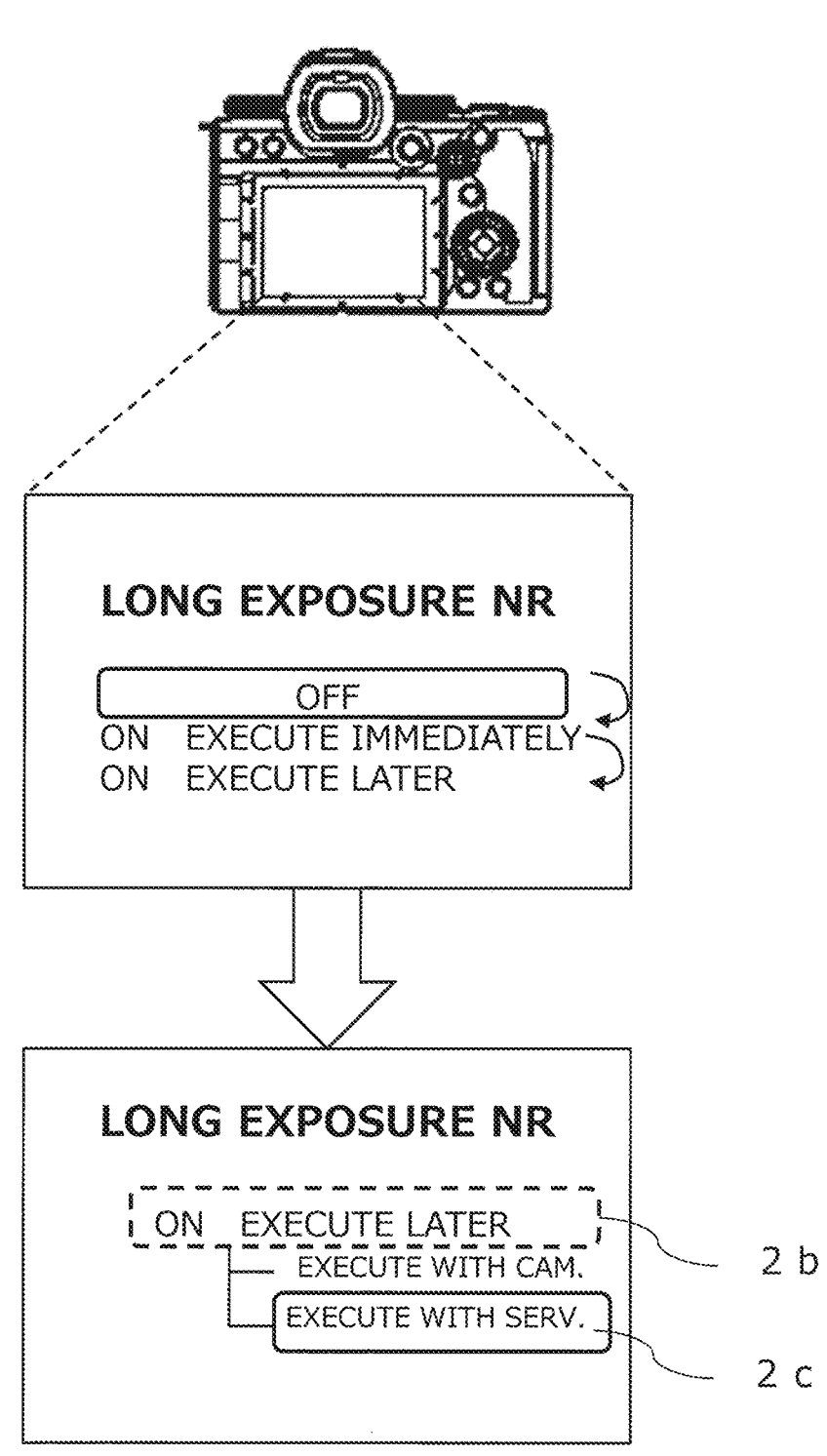
FIG. 10 is a diagram showing an example of a menu setting screen displayed on a display monitor of a digital camera according to the second exemplary embodiment of the present disclosure.

FIG. 10 shows an example of a menu setting screen displayed on the display monitor 130 of the digital camera 100 according to the present embodiment. When the user selects the item 2b indicating "ON: execute later", two sub-menus "execute with camera" and "execute with server" are further displayed.

"Execute with camera" is the same as the operation of the digital camera 100 according to the first embodiment.

"Execute with server" is an item newly introduced in the digital camera 100 according to the present embodiment. When the item 2c indicating "execute with server" is selected, in the present embodiment, the server device 220 executes the dark subtraction. Every time a one-time imaging operation is completed, the digital camera 100 transmits the photographing condition data and the image data to the server device 220. Accordingly, in the server device 220, it is possible to cause the server device 220 to execute the dark subtraction without a large time lag. Alternatively, when a plurality of times of the normal imaging operation is completed, the digital camera 100 collectively transmits a plurality of sets of the photographing condition data and the image data to the server device 220.

The server device 220 determines a dark image with reference to the received photographing condition data. The dark image may be prepared in advance or may be calculated by calculation. Hereinafter, an example of calculating a dark image by calculation will be described.

Figure 11:
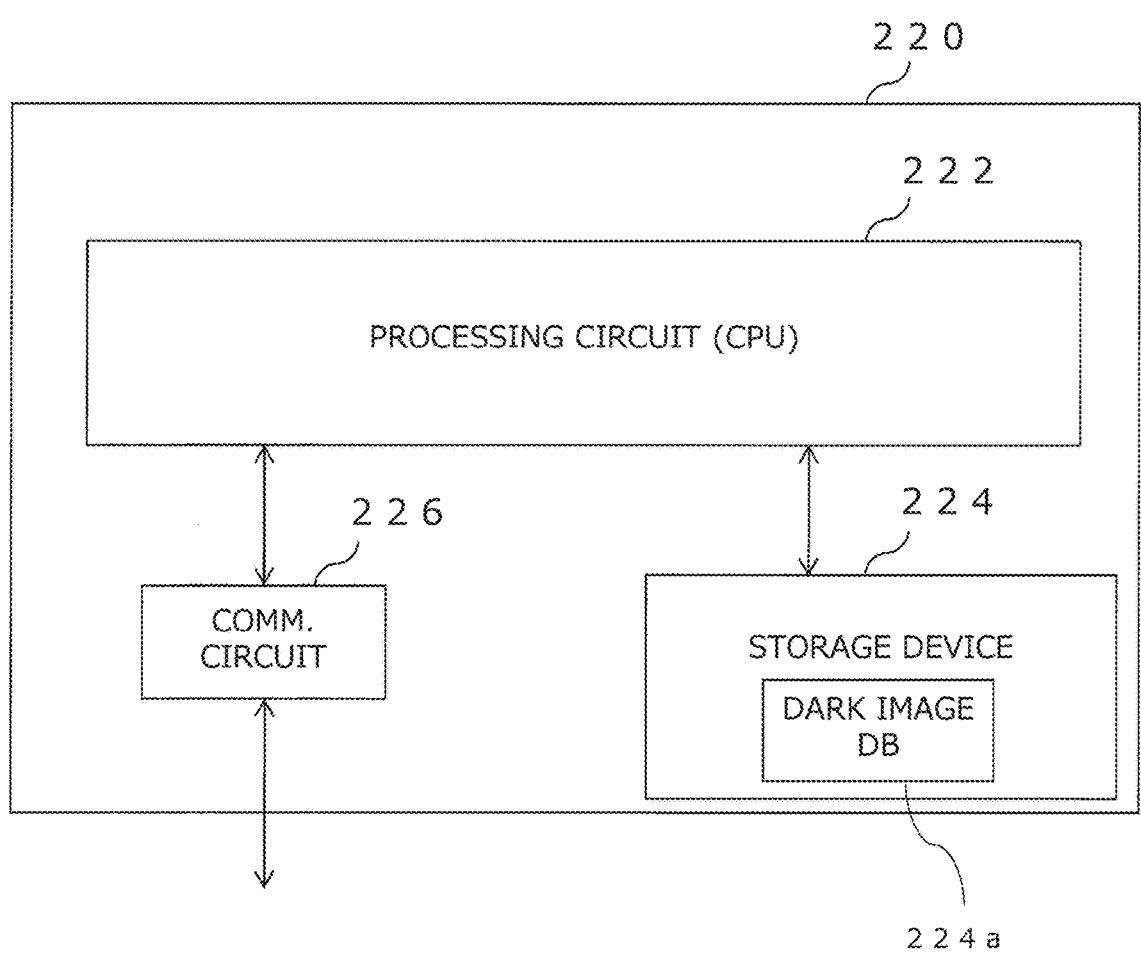
FIG. 11 is a hardware configuration diagram of a server device.

FIG. 11 is a hardware configuration diagram of the server device 220.

The server device 220 includes a processing circuit 222, a storage device 224, and a communication circuit 226.

The processing circuit 222 includes a CPU and the like, and the CPU executes a program (software) to implement processing and functions of the server device 220 according to the present embodiment. The processing circuit 222 may include a processor including a dedicated electronic circuit designed to achieve a predetermined function instead of the CPU. That is, the processing circuit 222 can be implemented with various processors such as a CPU, an MPU, a GPU, a DSU, an FPGA, and an ASIC. The processing circuit 222 may include one or more processors.

The storage device 224 is a recording medium that functions as a work memory of the server device 220. The storage device 224 may include a DRAM and/or a flash ROM. In the present embodiment, the storage device 224 stores a dark subtraction database (DB) 224a in advance. The dark subtraction DB 224a includes a reference dark image group and a generation rule of the dark image. The reference dark image group is a set of reference dark images prepared for each of various photographing conditions. More specifically, one dark image is prepared for each of the various combinations of the shutter speed, the ISO sensitivity, and the temperature of the image sensor 115. It is considered that the accuracy of the dark subtraction increases as the number of dark images increases. However, as a trade-off, the total data size of the dark image increases. A person skilled in the art can appropriately set each of the number of stages of the shutter speed, the ISO sensitivity, and the temperature of the image sensor 115 in consideration of requirements such as the total data size of the dark image. The generation rule of the dark image is a rule for generating a dark image from a given photographing condition and a reference dark image. An example of the rule is the same as the content described in the first embodiment.

The communication circuit 226 is, for example, a communication interface such as an Ethernet (registered trademark) communication terminal or a USB (registered trademark) terminal. The communication circuit 226 may perform communication in conformity with a standard such as IEEE 802.11, 4G, or 5G. The communication circuit 226 receives, from the digital camera 100, a photographing condition and an instruction to designate that the digital camera 100 and the server device 220 operate in cooperation.

Figure 12:
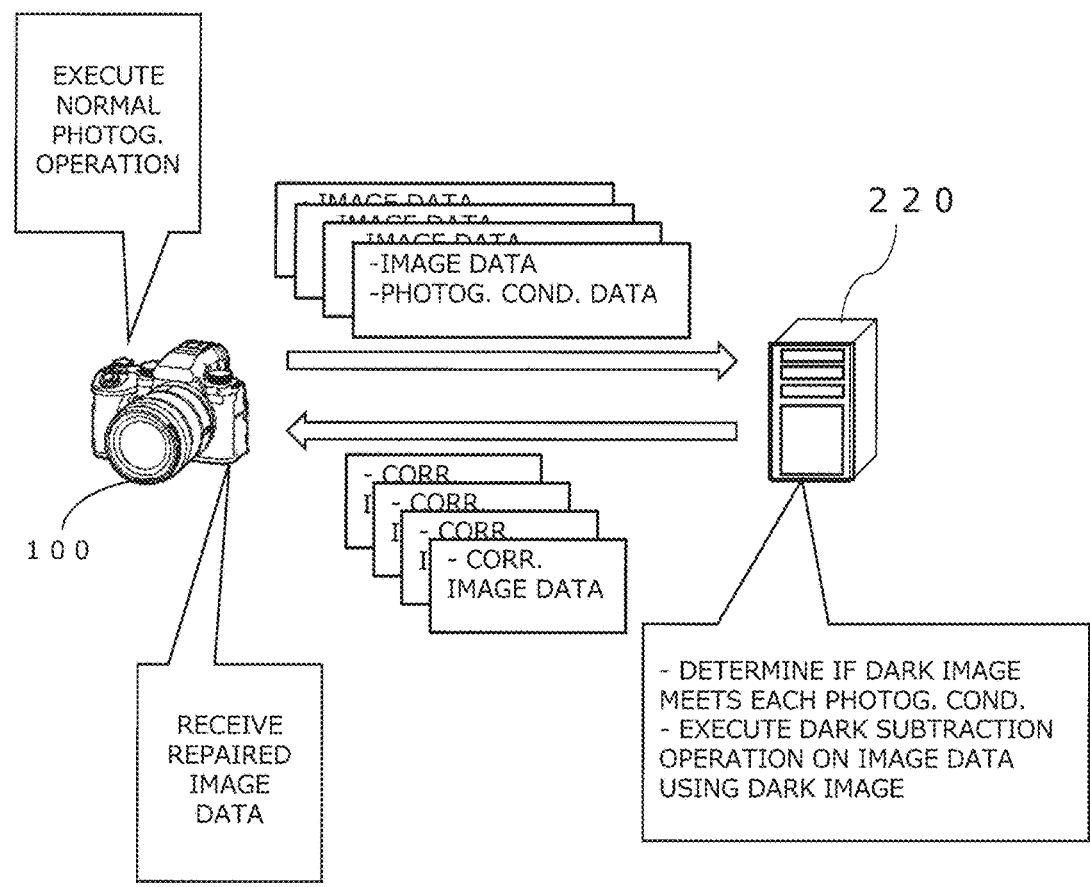
FIG. 12 is a diagram for illustrating the operations of the digital camera and the server device constituting the imaging system.

FIG. 12 is a diagram for illustrating the operations of the digital camera 100 and the server device 220 constituting the imaging system 200.

After executing the normal imaging operation, the digital camera 100 transmits one or more sets of photographing condition data and image data to the server device 220.

The processing circuit 222 of the server device 220 refers to the dark subtraction DB 224a based on the photographing condition and determines a dark image to be used for image data photographed by the digital camera 100. Specifically, the processing circuit 222 refers to the dark subtraction DB 224a based on the photographing condition received from the digital camera 100 and determines a dark image to be used for dark subtraction. The processing circuit 222 performs a dark subtraction operation on the image received from the digital camera 100 using the image data of the dark image. The processing circuit 222 transmits the repaired image data obtained by the dark subtraction operation to the digital camera 100 through the communication circuit 226.

The digital camera 100 receives the repaired image data from the server device 220 and stores the repaired image data in, for example, the memory card 142. The digital camera 100 does not need to perform not only the dark photographing but also the dark subtraction operation, and the processing load is greatly reduced. Therefore, it is not necessary to secure the processing program and the buffer memory for the dark subtraction operation, and it is possible to achieve a reduction in the manufacturing cost and improvement in the convenience of the user.

It should be noted that in the above example, the server device 220 performs the dark subtraction operation, but the digital camera 100 may perform the dark subtraction. In this case, the digital camera 100 transmits the photographing condition data to the server device 220, but does not need to transmit the image data. On the other hand, the server device 220 determines a dark image according to a photographing condition and transmits the dark image to the digital camera 100. Then, the digital camera 100 performs dark subtraction using the received dark image data. Since the digital camera 100 still does not need to perform the dark photographing, the processing can be speeded up, and the convenience of the user can be enhanced.

Aspects of Present Disclosure

As described above, the present disclosure includes the following aspects.

<First Aspect>

An imaging apparatus capable of performing a normal imaging operation of capturing a subject image to generate image data and a dark subtraction operation of performing dark subtraction on the image data to generate repaired image data, the imaging apparatus including:

an image sensor configured to generate image data during the normal imaging operation when a shutter is opened under a predetermined photographing condition;

a recorder configured to record the image data and photographing condition data indicating the photographing condition in a recording medium; and a controller configured to control the image sensor, in which the controller performs the normal imaging operation a plurality of times, and then performs a dark subtraction operation on each piece of image data using a dark image corresponding to each photographing condition.

<Second Aspect>

The imaging apparatus according to the first aspect, further including a user interface configured to receive a designation of an execution timing at which the dark subtraction operation is performed from a user, and in which the execution timing includes a timing different from a timing immediately after an end of the normal imaging operation.

<Third Aspect>

The imaging apparatus according to the second aspect, in which when the execution timing arrives, the controller captures the dark image under a condition identical to a photographing condition of at least one piece of image data among a plurality of pieces of image data generated by the plurality of times of normal imaging operation, and performs the dark subtraction operation on the at least one piece of image data using the captured dark image.

<Fourth Aspect>

The imaging apparatus according to the second aspect, in which the recorder retains a reference dark image and a rule for generating the dark image from the reference dark image, and in which when the execution timing arrives, the controller generates the dark image from the reference dark image based on a photographing condition of at least one piece of image data among a plurality of pieces of image data generated by the plurality of times of normal imaging operation and the rule, and performs the dark subtraction operation on the at least one piece of image data using the generated dark image.

<Fifth Aspect>

The imaging apparatus according to the second aspect, in which the recorder retains image data of a plurality of dark images captured for each of a plurality of photographing conditions, and in which when the execution timing arrives, the controller selects one dark image from the plurality of dark images based on a photographing condition of at least one piece of image data among a plurality of pieces of image data generated by the plurality of times of normal imaging operation and performs the dark subtraction operation on the at least one piece of image data using the selected dark image.

<Sixth Aspect>

The imaging apparatus according to any one of the third to fifth aspects, in which the controller determines if a photographing condition of the at least one piece of image data meets a condition requiring the dark subtraction, and performs the dark subtraction operation when determining that the photographing condition corresponds to a condition requiring the dark subtraction.

<Seventh Aspect>

The imaging apparatus according to any one of the third to fifth aspects, in which when a photographing condition of each of the plurality of pieces of image data is identical, the controller performs a dark subtraction operation on the plurality of pieces of image data using the common dark image.

<Eighth Aspect>

An imaging system including an imaging apparatus and a server device capable of communicating with each other, the imaging apparatus including:

an image sensor configured to generate image data during a normal imaging operation when a shutter is opened under a predetermined photographing condition;

a recorder configured to record the image data and photographing condition data indicating the photographing condition in a recording medium;

a controller configured to control the image sensor;

a user interface configured to receive, from a user, designation to perform the dark subtraction operation in cooperation with the server device; and a first communication circuit configured to transmit the photographing condition and the designation, and the server device including:

a second communication circuit configured to receive the photographing condition and the designation; and a server controller configured to determine a dark image to be used for the image data based on the photographing condition, in which the server controller determines the dark image based on the photographing condition from the imaging apparatus, and in which one of the imaging apparatus and the server device performs a dark subtraction operation of performing a dark subtraction on the image data to generate repaired image data.

<Ninth Aspect>

The imaging system according to the eighth aspect, in which the server device includes a server storage device that stores a reference dark image and a rule for generating the dark image from a given photographing condition and the reference dark image, or stores a plurality of dark images for each of a plurality of photographing conditions of the imaging apparatus, and in which the server controller determines, as the dark image, a dark image generated using the reference dark image and the rule stored in the server storage device, or a dark image selected from the plurality of dark images stored in the server storage device, based on the photographing condition from the imaging apparatus.

The present disclosure is applicable to an imaging apparatus.

What is claimed is:

1. An imaging apparatus capable of performing a normal imaging operation of capturing a subject image to generate image data and a dark subtraction operation of performing a dark subtraction on the image data to generate repaired image data, the imaging apparatus comprising:

an image sensor configured to generate image data during the normal imaging operation when a shutter is opened under a predetermined photographing condition;

a recorder configured to record the image data and photographing condition data indicating the photographing condition in a recording medium; and a controller configured to control the image sensor, wherein the controller performs the normal imaging operation a plurality of times, and then performs the dark subtraction operation on each piece of image data using a dark image corresponding to each photographing condition, the dark image corresponding to each photographing condition being acquired subsequent to a completion of the normal imaging operation of the plurality of times, and further comprising a user interface configured to receive a designation of an execution timing at which the dark subtraction operation is performed from a user, and wherein the execution timing includes a timing different from a timing immediately after an end of the normal imaging operation.

2. The imaging apparatus according to claim 1, wherein when the execution timing arrives, the controller captures the dark image under a condition identical to a photographing condition of at least one piece of image data among a plurality of pieces of image data generated by the plurality of times of normal imaging operation, and performs the dark subtraction operation on the at least one piece of image data using the captured dark image.

3. The imaging apparatus according to claim 1, wherein the recorder retains a reference dark image and a rule for generating the dark image from the reference dark image, and wherein when the execution timing arrives, the controller generates the dark image from the reference dark image based on a photographing condition of at least one piece of image data among a plurality of pieces of image data generated by the plurality of times of normal imaging operation and the rule, and performs the dark subtraction operation on the at least one piece of image data using the generated dark image.

4. The imaging apparatus according to claim 1, wherein the recorder retains image data of a plurality of dark images captured for each of a plurality of photographing conditions, and wherein when the execution timing arrives, the controller selects one dark image from the plurality of dark images based on a photographing condition of at least one piece of image data among a plurality of pieces of image data generated by the plurality of times of normal imaging operation and performs the dark subtraction operation on the at least one piece of image data using the selected dark image.

5. The imaging apparatus according to claim 2, wherein the controller determines if a photographing condition of the at least one piece of image data meets a condition requiring the dark subtraction, and performs the dark subtraction operation when determining that the photographing condition meets a condition requiring the dark subtraction.

6. The imaging apparatus according to claim 3, wherein the controller determines if a photographing condition of the at least one piece of image data meets a condition requiring the dark subtraction, and performs the dark subtraction operation when determining that the photographing condition meets a condition requiring the dark subtraction.

7. The imaging apparatus according to claim 4, wherein the controller determines if a photographing condition of the at least one piece of image data meets a condition requiring the dark subtraction, and performs the dark subtraction operation when determining that the photographing condition meets a condition requiring the dark subtraction.

8. The imaging apparatus according to claim 2, wherein when a photographing condition of each of the plurality of pieces of image data is identical, the controller performs the dark subtraction operation on the plurality of pieces of image data using the common dark image.

9. The imaging apparatus according to claim 3, wherein when a photographing condition of each of the plurality of pieces of image data is identical, the controller performs the dark subtraction operation on the plurality of pieces of image data using the common dark image.

10. The imaging apparatus according to claim 4, wherein when a photographing condition of each of the plurality of pieces of image data is identical, the controller performs the dark subtraction operation on the plurality of pieces of image data using the common dark image.

11. An imaging system including an imaging apparatus and a server device capable of communicating with each other, the imaging apparatus including:

an image sensor configured to generate image data during a normal imaging operation when a shutter is opened under a predetermined photographing condition;

a recorder configured to record the image data and photographing condition data indicating the photographing condition in a recording medium;

a controller configured to control the image sensor;

a user interface configured to receive, from a user, a designation to perform a dark subtraction operation in cooperation with the server device; and a first communication circuit configured to transmit the photographing condition and the designation, and the server device including:

a second communication circuit configured to receive the photographing condition and the designation; and a server controller configured to determine a dark image to be used for the image data based on the photographing condition, wherein the server controller determines the dark image based on the photographing condition from the imaging apparatus, and wherein one of the imaging apparatus and the server device performs a dark subtraction operation of performing a dark subtraction on the image data to generate repaired image data.

12. The imaging system according to claim 11, wherein the server device includes a server storage device that stores a reference dark image and a rule for generating the dark image from a given photographing condition and the reference dark image, or stores a plurality of dark images for each of a plurality of photographing conditions of the imaging apparatus, and wherein the server controller determines, as the dark image, a dark image generated using the reference dark image and the rule stored in the server storage device, or a dark image selected from the plurality of dark images stored in the server storage device, based on the photographing condition from the imaging apparatus.

13. The imaging apparatus according to claim 1, wherein the photographing condition includes a temperature measured by a temperature sensor.

\* \* \* \* \*